United States Patent [19]

St. Julien

[11] Patent Number: 5,525,291
[45] Date of Patent: Jun. 11, 1996

[54] MOVABLE EXTRUSION DIE AND METHOD OF USE

[75] Inventor: Dell J. St. Julien, Watkins Glen, N.Y.

[73] Assignee: Corning Incorporated, Corning, N.Y.

[21] Appl. No.: 341,667

[22] Filed: Nov. 17, 1994

Related U.S. Application Data

[62] Division of Ser. No. 215,494, Mar. 21, 1994, abandoned.

[51] Int. Cl.$^6$ ................................................. B22F 3/20
[52] U.S. Cl. ........................... 419/41; 419/36; 419/5; 419/10; 419/19
[58] Field of Search ....................... 419/5, 10, 19, 419/36, 41; 425/464; 264/63

[56] References Cited

U.S. PATENT DOCUMENTS

| | | | |
|---|---|---|---|
| Re. 33,013 | 8/1989 | Takeuchi et al. | 438/116 |
| 3,899,555 | 8/1975 | Takao et al. | 264/44 |
| 3,905,743 | 9/1975 | Bagley | 425/464 |
| 4,127,691 | 11/1978 | Frost | 428/116 |
| 4,304,585 | 12/1981 | Oda et al. | 65/43 |
| 4,320,074 | 3/1982 | Birchall et al. | 264/8 |
| 4,996,015 | 2/1991 | Yoshimoto et al. | 264/177.11 |
| 5,063,029 | 11/1991 | Mizuno et al. | 422/175 |
| 5,202,547 | 4/1993 | Abe et al. | 219/552 |
| 5,238,386 | 8/1993 | Cunningham et al. | 425/192 R |
| 5,316,577 | 5/1994 | Wu | 106/197.1 |
| 5,373,634 | 12/1994 | Lipp | 29/890.03 |

*Primary Examiner*—Donald P. Walsh
*Assistant Examiner*—John N. Greaves
*Attorney, Agent, or Firm*—Timothy M. Schaeberle

[57] ABSTRACT

The invention relates to a method of forming honeycomb structures having cross-directional flow channels, such as cross-flow cellular bodies using a novel movable die which is adapted to move while extrudate is passing through the die, thus causing the cells or channels to alternate between straight-through flow, Z-flow, L-flow, U-flow or other similar cross-directional flow patterns. This novel die arrangement may be comprised of either a single movable die body, or a plurality of die parts or sections all of which are independently movable relative to the other.

13 Claims, 6 Drawing Sheets

MOVABLE EXTRUSION DIE AND METHOD OF USE

This application is a divisional of Ser. No. 08/219,494, filed on Mar. 21, 1994, abandoned.

BACKGROUND OF THE INVENTION

The present invention relates to a movable extrusion die useful for making honeycomb or cellular bodies in which the passages or channels are not always straight or parallel to the axis of extrusion.

Standard monolithic dies for extruding cellular structures are usually made using straight and parallel feed holes which communicate from the inlet side of the die to the slots in the outlet face of the die which is stationary, thus forming straight, parallel cells or channels. However, straight and parallel cells are not appropriate for certain applications. In some applications it is desirable to have the fluid make several passes through the channels before it is discharged. Multiple passes lead to more thorough heating and/or cleaning as the gas is allowed prolonged contact with the heat exchanger, catalyst or filter.

Extrusion dies can be formed in unitary die blocks by utilizing conventional machining and cutting techniques, EDM, or chemical machining. Traditional methods for making structures with non-parallel channels or passages generally require multiple steps. For example, in one approach a cellular ceramic body is cut and plugged so as to form non-parallel flow directions. In another approach often used for cross-directional flow structures such as heat exchangers and fuel cells, layers of green or fired sub-assemblies are formed by frit-bonding. This is the method often used for fuel cells where monolithic and planar structures contain non-parallel channels for fuel and air such as found in heat exchangers.

Heat exchangers are typically cross-flow structures formed by first extruding a honeycomb-like body of ceramic material from a die orifice. This extrusion results in a block of ceramic material having flow channels or cells which are generally of square or other rectangular cross-section, arranged parallel and adjacent to one another along the axis of extrusion. To form cross-flow heat exchangers, portions of the sides of the extruded ceramic block are commonly cut away to convert the ceramic block having straight-through passages into a ceramic block alternating between rows of straight-through flow, and Z-flow, L-flow, U-flow or other similar cross directional flow through the ceramic block. The cross-flow (Z-flow, L-flow, etc.) channels are typically made by sawing into the sides of some of the channels in the ceramic block and afterwards sealing the ends of these channels, thereby forming the cross-flow channels. In addition to heat exchangers, cross-flow structures are also useful for various other applications such as filtration, catalysis, oxygen production, and energy production. In cross-flow applications, gas or fluid flow in more than one direction through the structure.

Various methods have been disclosed for making cross-flow structures for example, by sawing and stacking. In the past, production of cellular structures having nonparallel channels or cells has required multiple steps. In one approach, a cellular ceramic body is cut and plugged so as to form non-parallel flow directions. In another approach, green or fired sub-assemblies of ceramic material are stacked and bonded together by sintering or frit-bonding. It has also been suggested to use the sawing technique to produce an L-flow cross-flow heat exchanger in which both flow directions through the heat exchanger follow an L-shaped path. When such sawing techniques are utilized to make cross-flow heat exchangers, very high precision extrusion geometries are required, as well as high precision cutting equipment, to arrive at a good quality finished cross-flow heat exchanger. Imprecision in either the extrusion or the cutting equipment can result in leakage paths between channels, which has a deleterious effect on heat exchanger performance. Further, because such heat exchangers are typically made by sawing into the side of the extruded ceramic body, it is very difficult to consistently achieve precise uniform cutting of the ends of the ceramic body. Such inconsistencies can result in leakage paths between adjacent channels. As mentioned above, such leakage paths can have a deleterious effect on heat exchanger performance.

Cross-flow heat exchangers having straight through flow channels in two directions have been disclosed in which layers having upstanding ribs thereon are laid one on top of another to form a heat exchanger having alternating layers of straight through flow channels, every other layer being arranged in a transverse direction to the one before it. The upstanding ribs of these layers in the green state are relatively weak, due in large part to their relative lack of support. Consequently, these methods sometimes result in the ribs being bent either prior to or during the stacking process. Furthermore, because each directional flow layer consists only of one layer of channels, the manufacturing process is relatively time consuming and labor intensive. Hitherto, traditional extrusion dies have proved inappropriate for producing cellular structures of the type described above where the channels are not necessarily parallel.

Co-pending, co-assigned U.S. Ser. No. 08/102,205 (Gardner et al.) has disclosed a method of preparing a cross-flow ceramic heat exchanger in which unidirectional layers of fluid flow passages are contacted with each other. Closed passages are disposed between two open and opposite ends, and the layers are arranged so that the passages of one layer are transverse to the passages of the other layer, thereby forming a laminated or layered structure. Batch materials used to extrude cross-flow blocks or portions are generally very stiff to prevent slumping or deformation of the extrudate as it exits the extrusion die. As a result, such batch materials require very high extrusion pressure, especially when forming very thin wall structures. To withstand such high pressures, it is necessary to use very strong and rigid extrusion dies. To overcome some of the above problems, recently in co-pending, co-assigned U.S. Ser. No. 08/132,923, (Faber et al.), a method has been suggested for forming self-supporting cellular structures by extruding relatively soft batches into a drying medium or by contacting the formed structure with a drying liquid immediately as the structure exits the extrusion die.

There continues to be a need for easier, more effective and less expensive methods for making cross-directional flow structures and other cellular structures in which the cells are not always parallel to the axis of extrusion. Accordingly, the object of the present invention is to provide an extrusion die and method of making geometrically complex cell directions such as cross-flow structures in which the cell directions are not always parallel to the axis of extrusion.

SUMMARY OF THE INVENTION

The present invention is directed to a movable extrusion die and a method of using such die to form honeycomb structures having complex geometric cell arrangements.

In one aspect, the invention relates to an apparatus for forming a unitary honeycomb structure having a matrix of cell walls defining a plurality of cells at least portions of at least some of which cells are directed at an angle from the axis of extrusion. In particular, the apparatus is composed of an extrusion die, equipped with moving means which cause the die to move in any desired direction to change cell directions.

In another aspect, the die may be composed of either one movable section, or two or more sections which are free to move relative to each other during the extrusion process.

In yet another aspect, the invention relates to a method of extruding cellular bodies having non-parallel flow channels or cells using soft batch materials having very low viscosities by contacting the extrudate with a drying or hardening medium and optionally drying in air and optionally sintering the extrudate.

As used in the specification:

"non-parallel cells" refers to cells which are at least in some portions not parallel to the axis of extrusion;

"continuous extruded structure" refers to a unitary extruded monolith having no seams or joints, that is the structure "as extruded" contains the characteristics or properties described. For example, a continuous extruded cross-flow structure would be a structure which when extruded, exits the extrusion die with cross-directions channels;

BRIEF DESCRIPTION OF THE DRAWINGS

FIGS. 1a and 1b are cross-sections of a z-cut plugged cellular body. FIG. 1a is a cross-section of a slice through the cells or flow channels, while

DETAILED DESCRIPTION OF THE INVENTION

The movable die of the invention is particularly useful for extruding cellular bodies in which the cells are non-parallel, such as cross-flow bodies. Cross-directional flow honeycomb structures are characterized by cell or channels which alternate between rows of straight-through flow, and Z-flow, L-flow, U-flow or other similar cross directional flow through the ceramic block. As stated earlier, hitherto, cross-flow channels have been made by sawing into the sides of some of the channels in a straight-through block and then sealing the ends of these channels to form cross-flow channels.

I have found that any standard extrusion die can be used in the apparatus of the invention provided such die is modified by incorporating a device in the die to permit movement of the die during extrusion and to adapt the die to the present invention. Any such extrusion die suitable for forming honeycomb structures, in particular those suitable for extruding metal and ceramic honeycomb structures can be used for the invention. To adapt such standard dies to the present method, the die is modified by equipping such die with moving means such as motor driven screws which allow the die to move during extrusion. As extrudable material passes through the die, the moving means cause the die to move, preferably in a reciprocating manner to form a honeycomb structure having cells which angles to the axis of extrusion.

Examples of standard extrusion dies which may be adapted for use according to the invention include those described in co-assigned U.S. Pat. Nos. 5,238,386 and 3,905,743 both herein incorporated by reference. In its simplest form, the apparatus of the invention can consist of a single standard die body such as described in U.S. Pat. No. 3,905,743, modified to provide the die with a device such as a lever, motor driven screw or arm to allow movement of the die body during extrusion. Preferably, the device allows lateral or reciprocating movement of the die. The die is comprised of a plurality of sheets of material each having opposed faces bounded by top and bottom edges, the sheets having a groove formed in one of the opposed faces, open to the bottom edge and closed by the other opposed face, additional grooves formed in the sheets open to the bottom edges and open at least to one of the opposed faces, the sheets being stacked together to form a plurality of unitary extrusion dies having opposing sides, the adjacent faces of the stacked sheets lying parallel to the axis of extrusion, each extrusion die being provided with an inlet and an outlet face, the dies being positioned so as to form a composite die comprising at least two extrusion dies, adjacent sides of extrusion dies lying parallel to the axis of extrusion and each die being free to move relative to the other. Further, a plurality of feed passageways are formed in the inlet face of each extrusion die which extend longitudinally inwardly within each die parallel to the axis of extrusion. The grooves, open to the bottom edge of the sheets provide a plurality of interconnected discharge slots in the outlet face which extend inwardly along the adjacent faces into communication with inner ends of the longitudinal feed passageways. The discharge slots include means for providing resistance to batch flow which is sufficient to insure that the batch material will flow laterally together within the depth of the discharge slots.

In one particularly useful embodiment, a composite die assembly is used comprising two or more die sections all of which are independently movable relative to other sections.

Figure 5:
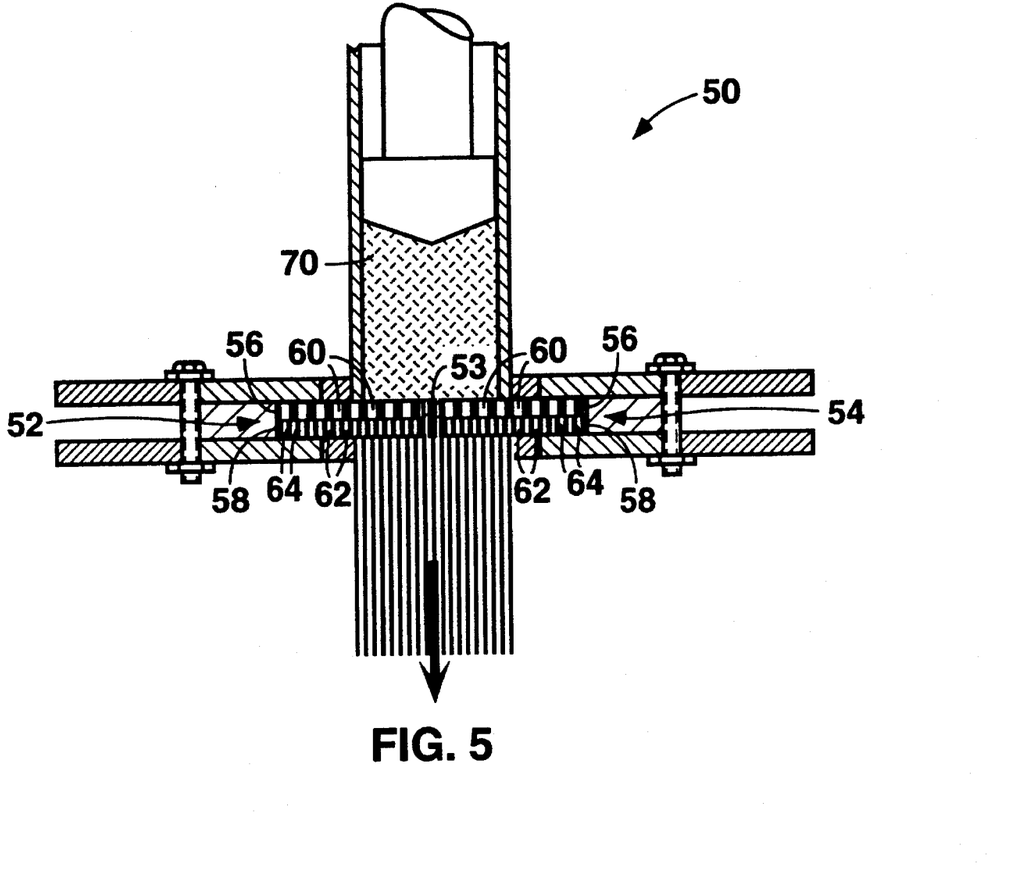
FIG. 5 is a schematic diagram of a cross-section of the extrusion die used to demonstrate cross-flow body extrusion. The die has two matching halves or sections with a shim placed between the halves.
Figure 6:
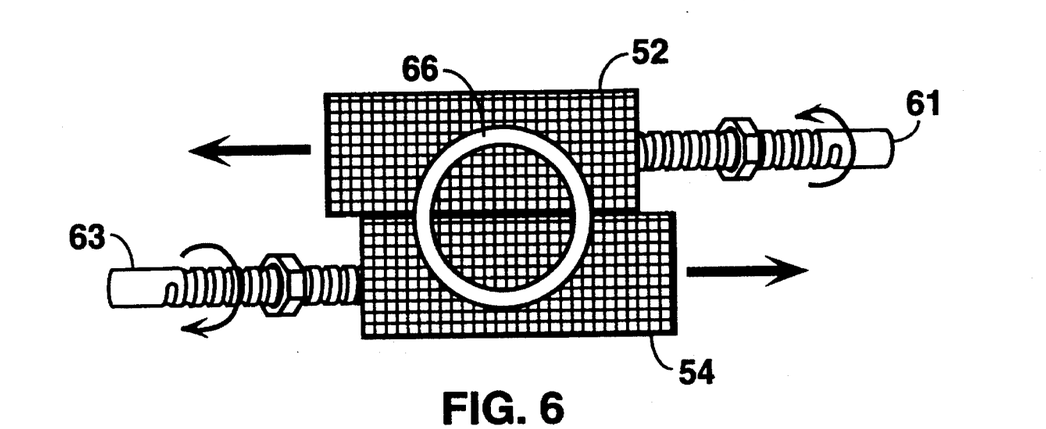
FIG. 6 is a schematic diagram showing the pin faces of the two die halves, the motor driven screws, and the opening of the lower plate of the die of FIG. 5.

During the extrusion process, as batch material is pushed through the die, adjacent sections of the die are caused to move laterally thus changing the cell directions. As a result, portions of the extruded structure will contain cells or channels which are sometimes not parallel to the axis of extrusion. The movement of the various sections can be achieved by any known means which will allow the sections to move relative to each other. For example, the die can be provided with motor driven screws which can be attached to the end sections as shown in FIGS. 5 and 6, and as described in Example 4. In this embodiment, a plastically deformable mixture is passed through the die sections each die being adapted to move relative to and independent of the other during the extrusion process. As the batch material is pushed through the die, adjacent sections of the die are caused to move independently so that the extruded structure contains non-parallel channel elements. Using this approach, cross-flow bodies are obtained which are at some angle greater than a few degrees (i.e., non-parallel).

Another such die having two or more die sections is described in co-pending, co-assigned U.S. Ser. No. 08/021,488, herein incorporated by reference, which discloses an extrusion die having a plurality of aligned, parallel plates. I have found that by providing each plate or group of plates with a device to allow each plate to move during extrusion, the referenced die can be adapted to extrude honeycomb structures having cells at an angle to the axis of extrusion using the method of the invention.

Similarly, the multi-part extrusion die described in U.S. Pat. No. 5,238,386 (herein incorporated by reference), comprising a plurality of unitary die body parts which form a discharge face of the multi-part extrusion die can also be adapted for the present invention. Each part can be provided with a suitable moving device, preferably a motor driven screw as described herein to permit lateral and reciprocating movement during extrusion. In this embodiment, each unitary die body part is provided with a device such as a motor-driven screw to cause the desired movement of the die body parts during extrusion in order to alter the channel directions.

Figure 1A:
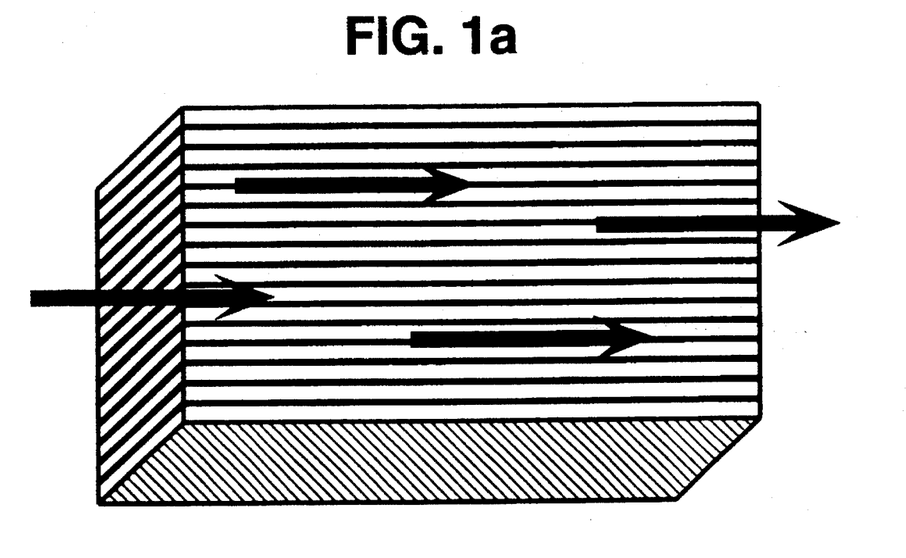
Figure 1B:
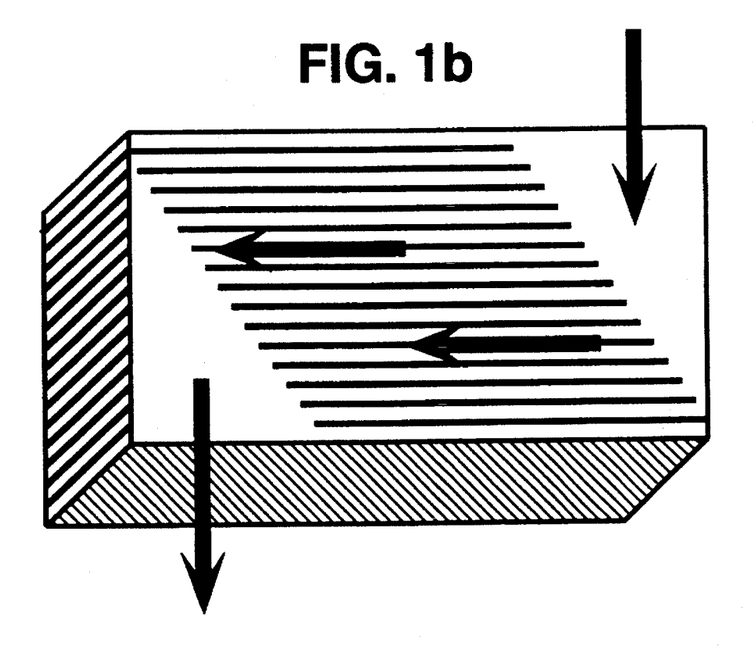
FIG. 1b is a cross-section through the z-cut channels. The arrows indicate the direction of flow.
Figure 2A:
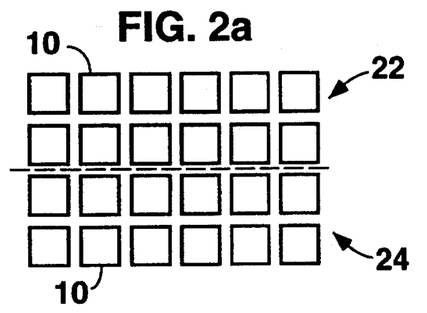
FIGS. 2a, 2b and 2c are schematic drawings of the pin face of a two-piece shuttle die at different times during extrusion.
Figure 2B:
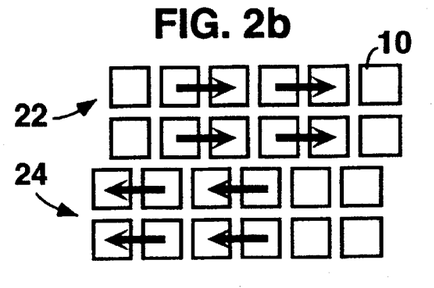
Figure 2C:
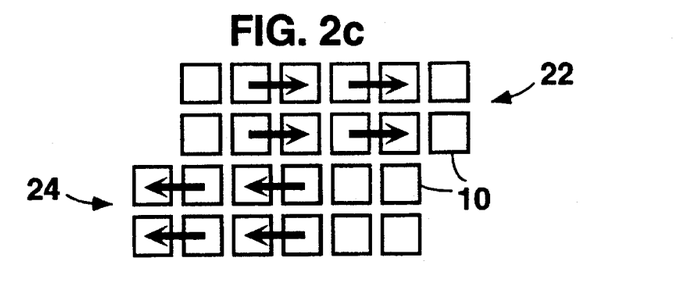

The motion of the die face which is useful for obtaining non-parallel flow is shown schematically in FIGS. 1a through 2c. In a traditional extrusion process, the pins 10 of the die form an array as shown in FIG. 2a. For the purpose of illustrating the present invention, the standard array is divided into two halves as indicated by the dashed line in FIG. 2a. Each half of the array represents one die section in a two-part (i.e., two die sections) embodiment in which each section or part moves relative to the other. The pins 10 in the top half 22 are then moved relative to the bottom half 24 as indicated by the arrows. In time, the pin array will be as shown in FIG. 2b and later as shown in FIG. 2c. The extrudate that is produced using this die will reflect the motion of the pins. By combining the lateral pin motion shown in FIGS. 2a–2c with the extrusion of the batch material through the array, the extrudate produced will contain cells which are not always parallel to the axis of extrusion.

Figure 3A:
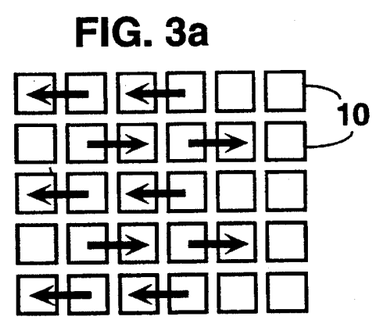
FIGS. 3a, 3b and 3c are schematic drawings of the pin face of a five-piece shuttle die at different times during extrusion.
Figure 3B:
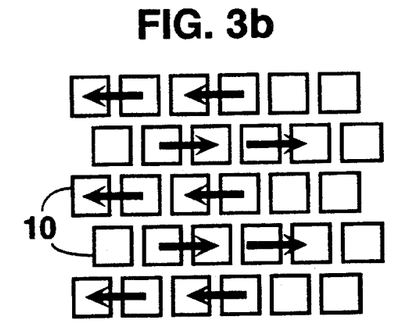
Figure 3C:
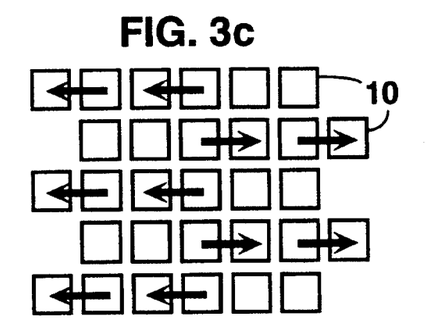
Figure 4A:
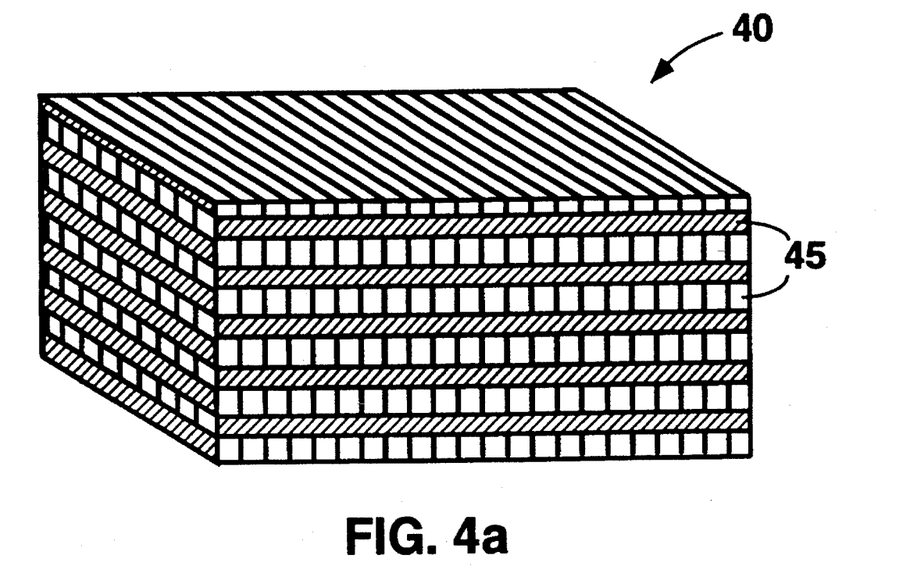
FIGS. 4a and 4b are schematic diagrams of two slices of a cross-flow body which could be produced by a movable (shuttle) extrusion die of the invention.
Figure 4B:
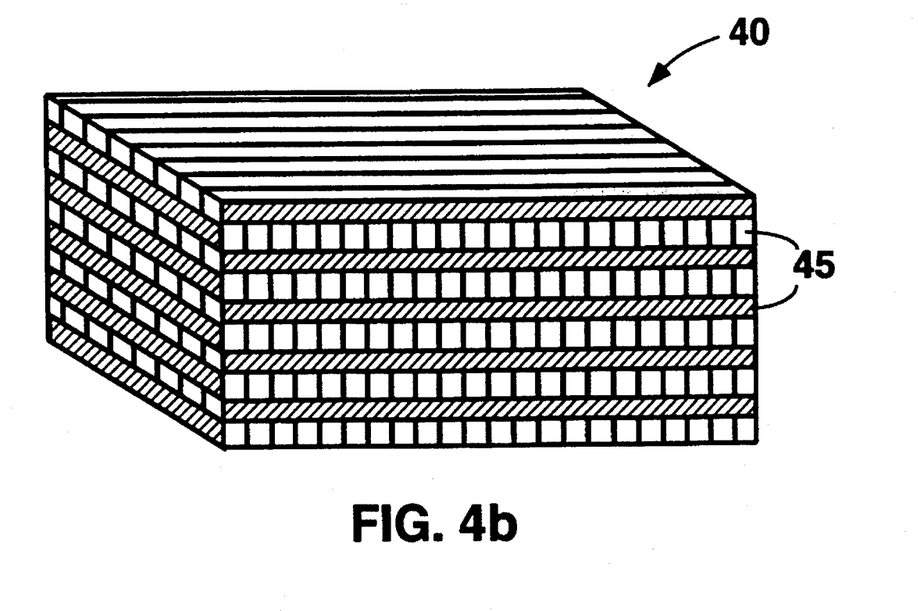

If the die is further divided so that every other row of pins moves in the same direction during extrusion, but adjacent rows move in opposite directions, the pin motion of such a die would be as shown schematically in FIGS. 3a–3c. FIG. 3a shows the position of the pins before extrusion, while FIGS. 3b and 3c show the location and motion of the die sections during extrusion. The arrows indicate the direction of motion of the die sections. FIGS. 4a and 4b are two cuts showing the alternating flow channels of such an extrudate formed using a similar die assembly. The extruded body 40 obtained from such a die would have layers of channels or cells 45 alternating between two different orientations. The angle between the cells or channels 45 is determined by the ratio of the linear rate of extrusion to the rate of die travel perpendicular to the extrusion direction.

In the illustrative schematics of the invention shown in FIGS. 5 and 6, the die is made up of two laterally connected sections 52 and 54, separated by shim 53. Each section has a body plate 56 and a face plate 58 each having an inlet face, an outlet face, and an outlet portion, the outlet face of the body plate 56 being in facing, abutting contact with the inlet face of the face plate 58. The body plate 56 has a plurality of parallel, elongated, feed holes 60 each having a longitudinal axis, the feed holes 60 extending from the inlet to the outlet face of the body plate 56, the face plate 58 having a plurality of intersecting slot segments 62 defining a plurality of rectangular pins 64 each having a pair of opposite longer sides, each pin 64 being bordered and defined by a plurality of slot segments 62, an outlet end of each of the feed holes 60 communicating with an associated, respective, intersection of the slot segments 62. Batch material 70 to be extruded passes from an inlet to an outlet end of each feed hole 60, thence to the inlet end of an associated slot segment intersection, thence both horizontally and downwardly from each associated slot intersection. As the material passes through the die, one or more die sections maybe made to move using motor driven screws 61 and 63 as shown in FIG. 6 to alter to cell direction. The sections may move in the same or different directions. Similarly, the die sections may be made to move at the same or different speeds. Also, one section may be stationary while other section is moving. The direction and speed of movement will depend of the desired cell configuration.

Each die section is further characterized in that the inlet face of the face plate has a plurality of recesses to thereby define a plurality of feed reservoirs, an outlet end of each of the feed holes communicating with a respective feed reservoir, and in that the feed holes are arranged in rows parallel to the longer sides of the rectangular pins, the feed holes being uniformly spaced from each other in any row, corresponding feed holes of adjacent rows being displaced from each other lengthwise of the rows so that the feed holes form staggered columns running transverse to the rows.

Figure 7:
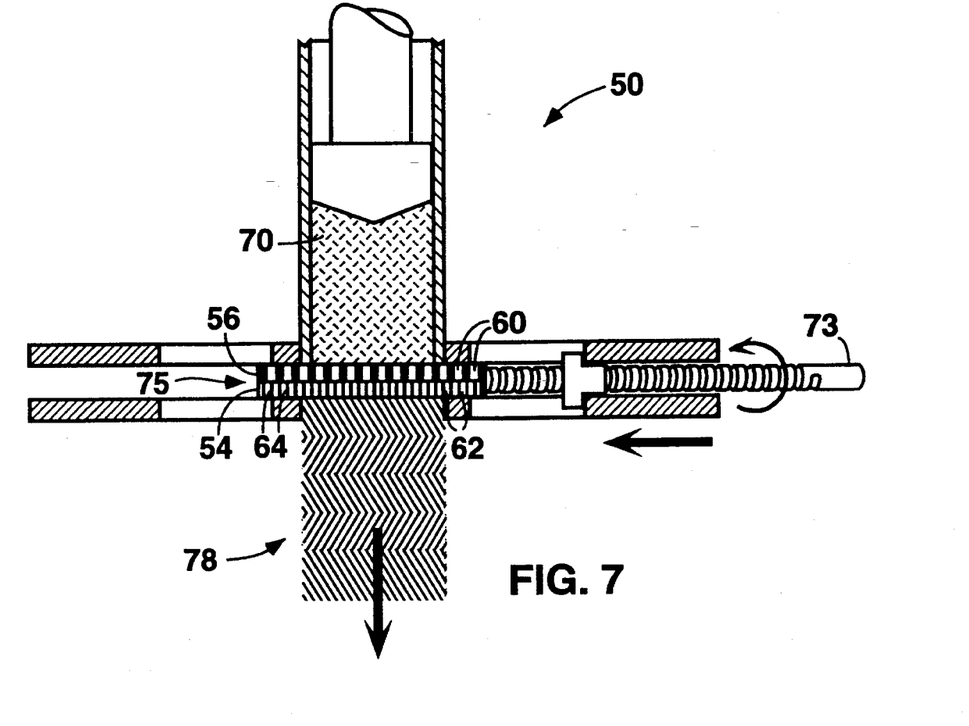
FIG. 7 is a schematic diagram of a cross-section of the extrusion apparatus from a direction perpendicular to that of FIG. 5. The diagonal lines of the extrudate indicate the direction of the channels produced by the die motion shown.

In FIG. 7a, a standard single die 50 is provided with moving means to allow the die to move in a reciprocating manner to alter the direction of the cells of the extrudate as shown. By varying the movement of the die relative to the extrudable material the angle and pattern of the channels can be varied in any manner. Examples of possible cell patterns which can be obtained using the method of the invention are shown in FIGS. 7b–7f.

Figure 8A:
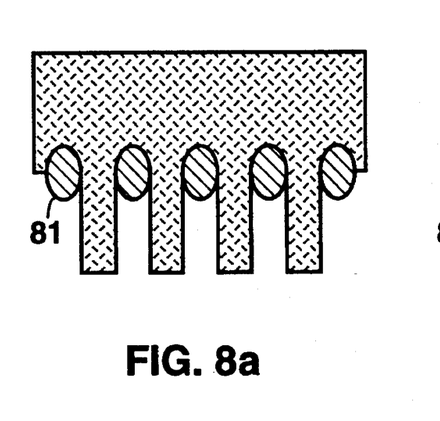
FIGS. 8a and 8b are schematic diagrams showing how different cam-pin shapes and sizes can be used to vary the width of cell walls.
Figure 8B:
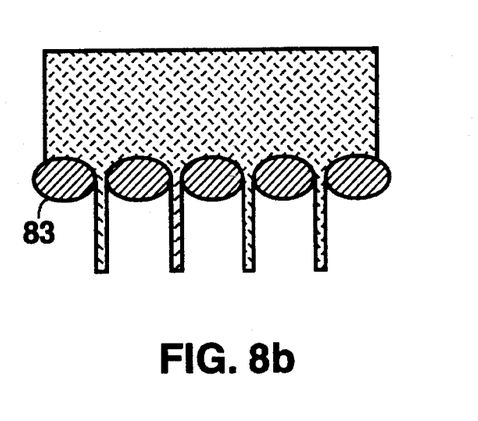
Figures 9, 10:
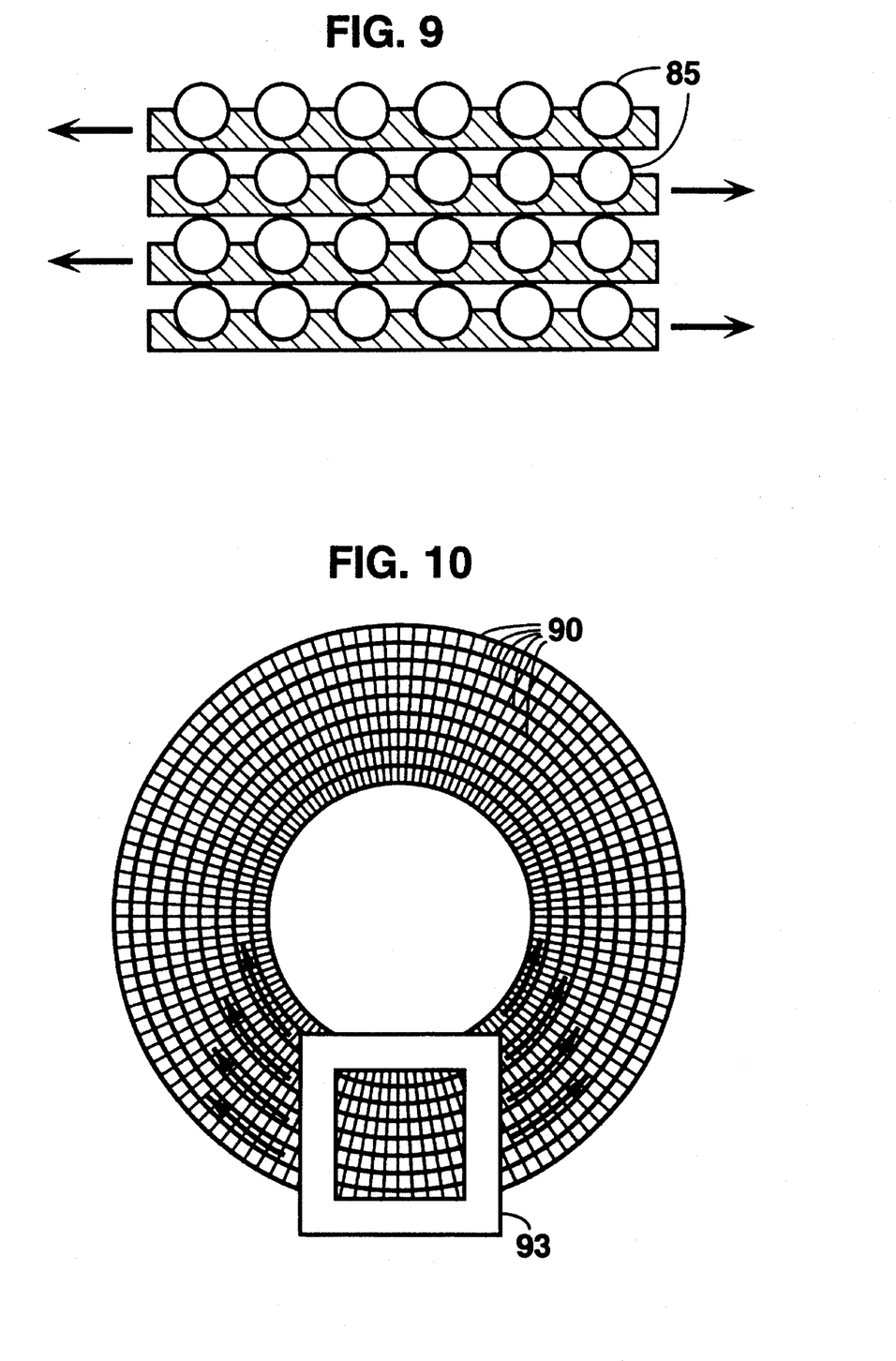
FIG. 9 is a schematic drawing of a section of a movable die having round or circular pins.
FIG. 10 is a schematic diagram of a shuttle die made up of concentric rings of pins. The arrows indicate the motion of the rings. The batch would be extruded through only one portion of the die such as is indicated by the mask.

By replacing the pins with cams of various shapes and sizes such as elliptical cams 81 and 83 (FIGS. 8a and 8b respectively), it is possible to vary the height of the cells or the thickness of the cell walls. In addition to the square or rectangular pins shown in the illustrative examples, the pins may be any geometry such as the round pins 85 as shown in FIG. 9. Although the illustrative die is composed of two rectangular die sections, the geometry of the die may vary depending on the desired final product. For example, the die may contain several concentric circular sections 90 such as shown in FIG. 10, wherein each concentric die section is independently movable as indicated by the arrows. In this embodiment, extrudable material is passed through a section of the die through a mask 93. The shape of the extrudate is determined by the shape of the mask. Useful dies may consist of pins connected in any fashion which are in motion during the extrusion of the batch provided such sections are independently moveable relative to each other. The arrows in FIG. 10 indicate the motion of the concentric circular die sections 90. The batch may be extruded either through one portion of the die using one mask 93 as shown, or several bodies may be extruded simultaneously or sequentially through other regions of the die using one or more masks.

Generally, batch materials for extruding honeycomb structures contain solid particles or precursors to such particles, binder and solvent. Additives such as dispersants, surfactants, flocculants, plasticizers, etc., are sometimes added for enhanced properties. The solid particles can be plastic, graphite, metal, ceramic, glass, carbon, precursors of these materials, or mixtures thereof. Surface defects occur in conventional extrudates due to local adhesion between the batch and the die wall, poor flow, or due to poor knitting of the batch material. Surface defects, such as checks and fissures, can also occur during drying due to drying stresses. Occurrence of surface defects can be reduced or eliminated by drying the extrudate of the invention in a drying or hardening liquid as disclosed in co-assigned, co-pending U.S. Ser. No. 08/132,923 (herein incorporated by reference), in which soft batches are extruded into large, complex shapes at lower pressures and then hardened in a buoyant drying or hardening liquid. After hardening, the extruded body can be further dried in air or in a controlled atmosphere if desired. Additional heating may also be necessary to produce a fired or sintered product.

There are many advantages to the use of soft batch materials. For example, soft (low viscosity) batches require lower extrusion pressures, increase die life by reducing die wear, and lead to more consistent products. As a result of the low extrusion pressures required to process soft batches, it is also possible to use a variety of materials including plastics, glass, graphite, metal, and ceramics to form the die orifice. A softer batch provides easier mixing of the batch components, improves batch homogeneity and leads to better dispersion of the binder. Soft batches also make it possible to extrude bodies with frontal areas larger than are possible with conventional stiff batches. In certain cases a softer batch will tend to give improved skin quality and reduce the number of surface checks.

EXAMPLES

In the following examples, cross-flow bodies were extruded using batch materials having the following composition:

1. Preparation of Standard Batch Material
   A. Dry Ingredients

| Batch Material | Type of Material | Weight (%) | Weight (g) |
|---|---|---|---|
| GK Hydrite MP | clay | 25.15 | 251.5 |
| GK Glomax LL | calcined clay | 21.17 | 211.7 |
| Pfizer MP 95-28 | talc | 40.21 | 402.1 |
| Alcan C701 | alumina | 13.47 | 134.7 |
| Total Oxide | | 100.00 | 1000.0 |

B. Liquid Composition (Binder and Solvent)

The liquid binder/solver composition was prepared using the following ingredients:

| Batch Material | Type of Material | Weight (%) | Weight (g) |
|---|---|---|---|
| Monsanto Butvar B-98 | binder | 6.00 | 60.0 |
| Ethanol | solvent | 18.00 | 180.0 |
| Propylene glycol | solvent/plasticizer | 20.90 | 209.0 |
| Total Binder System | | 44.90 | 449.0 |
| Total Solvent | | 38.90 | 389.0 |

The dry ingredients were measured out in a suitable polyethylene jug, usually ½ or 1 gallon in size and mixed using a Turbula mill. The binder was prepared as a liquid mixture and added wet.

To 180 g of ethanol was added 60 g of Butvar B-98 binder (available from Monsanto). This mixture was rolled overnight in a 500 ml polyethylene bottle. To the mostly dissolved binder was added 209 g of propylene glycol. The mixture was rolled for several hours before adding to the dry batch ingredients in the 1 gal polyethylene bottle. 10 grams, or 2.2% of the binder mixture, remained in the 500 ml bottle and was not in the batch. The 1 gal bottle containing the dry and wet ingredients was rolled for several hours before extruding spaghetti strands 5 times to ensure good mixing. The spaghetti extruded at 350 to 400 psi. The batch was extruded through a nominal 400/6 die and a portion collected. The extrusion pressure was 350 to 375 psi.

2. Preparation of a Modified (Soft) Batch Material

To approximately 395 g of the above standard batch material was added about 20 g of additional solvent comprising approximately 55% ethanol and 45% propylene glycol. The additional solvent was incorporated by kneading. The additional solvent made the batch much softer. The modified batch was then extruded through the moveable die apparatus described in Example 3, using the method described in Example 4 below. Examples of other useful modified soft batches which may be used for the invention are given in Table 1 below:

TABLE 1

| | All batches are relative to 1,000 g of ceramic batch. | | | | | |
|---|---|---|---|---|---|---|
| | Liquid Content (g) | | | Total | Total | Polyvinyl |
| Example Number | Ethanol | Dibutyl Phthalate | Propylene Glycol | Liquid (g) | Liquid (cc) | Butyral (g) |
| 1 | 424.7 | 5 | — | 429.7 | 542.9 | 50 |
| 2 | 365/IPA* | — | — | 365 | 464.7 | 60 |
| 3 | 365 | — | — | 365 | 462.4 | 60 |
| 4 | 321 | 24 | — | 345 | 429.7 | 60 |
| 5 | 180 | — | 205 | 385 | 425.9 | 60 |
| 6 | 316 | 24 | — | 340 | 423.4 | 60 |
| 7 | 219 | — | 140 | 359 | 412.6 | 35† |
| 8 | 315 | 12 | — | 327 | 410.6 | 60 |
| 9 | 286 | 24 | — | 310 | 385.4 | 60 |
| 10 | 232 | 24 | 70 | 326 | 384.5 | 70.9 |
| 11 | 200 | — | 135 | 335 | 383.7 | 60 |
| 12 | 253 | 25 | 15/Water** | 293 | 359.5 | 50 |

*Isopropyl Alcohol
**Water
†High Molecular Weight Polyvinyl Butyral

3. The Movable Die

The die is shown schematically in FIGS. 5 through 7. For demonstration purposes a small extrusion apparatus was devised to approximate the moveable die. The extrusion apparatus consisted of a 60 cc polyethylene syringe with the end cut off which acted as the ram. The syringe was inserted into one of two plates, each containing a ⅝" center hold just large enough to accommodate the syringe end and a number of additional holes for attachment. The shuttle die itself consisted of two 13/16" by 2" sections of a 200/15 CelcorR die which had been thinned to remove all but ⅛" of the feed holes. This was placed between the two plates which were held together by bolts. FIG. 5 is a cross-section of the extruder showing the plates, belts, syringe with plunger, two half dies and extrudate. Two motor driven screws were used to move the die sections, and various screws spacers, and shims were employed to hold everything in place.

4. Extrusion using the Movable Die

The die halves were moved relative to each other using two independent motor driven screws. FIG. 6 shows the die assembly looking up from the bottom. The two halves of the die and the motor driven screws are shown.

In this experiment, the screw speed was between 0.6 and 0.9 revolutions per second. The screw pitch was 20 threads per inch making the speed of each halve between 0.03 and 0.045 inches per second. The relative velocity of the two halves was then between 0.06 and 0.09 inches per second. Pressure of about 150 to 230 psi (1030 to 1580 KPa) was then applied on the syringe to extrude the batch. The resulting extrudate was slightly over 1" in diameter and limited by the diameter of the hole in the plate opposite the syringe "ram".

The first inch or so was extruded before the motors were turned on. When both motors were engaged, the die halves moved with respect to the plates which held them. Batch material was supplied by pushing on the syringe. The thickness of the wall between the two halves was determined by two 5 mil. shims placed between the two halves. These shims allow the two die halves to slide easily past each other. The wall formed between the two halves remained stationary while the remaining walls moved with the moving die sections.

While the die halves were moving, cells were terminated as the die moved past the hole in the bottom plate formed by the mask 66 as shown in FIG. 6. Since the channels or cells are not parallel to the extrusion direction, at any time during extrusion, some channels or cells are being terminated while others are being formed. This termination occurs as the die moves past the mask which in this case, is the hole in the bottom of the plate. The termination resulted in openings in the side of the extrudate. As new portions of each die half were exposed to the hole, new cells were formed. The cell termination worked cleanly leaving open cells for cross-flow. Uneven flow through the die may cause knitting problems which may hinder the extrusion process. Such problems can be prevented or eliminated by the use of flow diverters.

After the die halves had each moved approximately ⅓" the motors were turned of. An additional 2 or so inches were extruded straight. An extrudate of approximately 5 inches in length was produced. In all 4 rows of cells were terminated on one half of the extrudate and 6 rows on the other half. This corresponded to die travel of approximately 0.28" and 0.42" respectively. This corresponds to angles of 8 and 12 degrees with respect to the extrusion direction and a relative angle of 20 degrees for the two halves.

5. Rigidifying the Extruded Body

The extruded bodies were rigidified using the method described in co-pending, co-assigned application Ser. No. 08/132,923, by bringing the soft formed green bodies into contact with a drying or hardening liquid in which the solvent is soluble and the solid particles and the binder are insoluble, and in some cases, the bodies were dried in air to form self-supporting cellular green bodies.

Although the apparatus and method of the invention are useful for cross-flow, they may also be employed to produce a wide variety of extrudate geometries where the direction of the cells is not always parallel to the direction of extrusion. Here the "direction of extrusion" is defined as the direction in which the extrudate is moving, indicated by arrows in FIGS. 5 and 7. Such designs may include cellular structures where all of the cells are parallel but the direction of the cells is not the same as the extrusion direction. It is possible to produce a body where an extrudable batch enters from the side and is exited out the end. It is also possible to produce bodies with walls that are not straight but are corrugated so as to increase turbulence.

In addition to the embodiments discussed above, it will be clear to persons skilled in the art that numerous modifications and changes can be made to the above invention without departing from its intended spirit and scope.

I claim:

1. A method of extruding a unitary honeycomb structure, the structure having a matrix of cell walls defining a plurality of cells some of which cells are at an angle to the axis of extrusion, the method comprising:

(a) providing an extrudable material comprising (1) solid particles selected from metals, carbon, graphite, ceramic powders, precursors and mixtures of these, (2) binder and (3) solvent;

(b) providing an extrusion die comprising:
  (1) a body plate and a face plate each having an inlet surface, an outlet surface, and
  an outlet portion, the outlet surface of the body plate being in facing, abutting contact with the inlet surface of the face plate, the body plate having a plurality of parallel, elongated, primary feed holes each having a longitudinal axis, the primary feed holes extending from the inlet to the outlet surface of the body plate, the face plate having a plurality of parallel, secondary feed holes, the outlet portion of the face plate having a plurality of intersecting slot segments defining a plurality of pins having a pair of opposite longer sides, each pin bordered and defined by a plurality of slot segments, an outlet end of each of the secondary feed holes communicating with an associated, respective, intersection of the slot segments; and
  (2) means for causing movement of the die during extrusion;
  the die being further characterized in that the inlet surface of the face plate has a plurality of recesses to thereby define a plurality of feed reservoirs, an outlet end of each of the primary feed holes communicating with a respective feed reservoir, each feed reservoir communicating with inlet ends of an associated plurality of the secondary feed holes, and in that the primary feed holes are arranged in rows parallel to the longer sides of the rectangular pins, the primary feed holes being uniformly spaced from each other in any said row, corresponding primary feed holes of adjacent said rows being displaced from each other lengthwise of the rows so that the primary feed holes form staggered columns running transverse to the rows;

(c) passing the extrudable material through the extrusion die such that the extrudable material passes from the inlet to the outlet end of each primary feed hole, thence to the inlet end of each of a plurality of associated secondary feed holes, thence to the outlet end of each the secondary feed hole, thence to an associated slot segment intersection, thence both horizontally and downwardly from each associated slot intersection, while simultaneously causing the die to move to form a continuous monolithic honeycomb structure having a complex cell structure in which a portion of the cells are at an angle to the axis of extrusion;

(e) contacting the monolith with a liquid in which the solvent is soluble and the solid particles and the binder are insoluble to form a self-supporting green cellular structure; and (f) firing the body to form a sintered honeycomb structure.

2. The method of claim 1, wherein the extrudable material further comprises plasticizers, dispersants, flocculants, gellants and mixtures of these.

3. The method of claim 2, wherein the plasticizers are selected from high molecular weight alcohols, glycols, polyethylene, polypropylene glycols, dibutyl phthalate and butyl phenyl phthalate.

4. The method of claim 1, wherein the extrudable material further comprises a catalytic compound.

5. The method of claim 4, wherein the catalytic compound comprises a base metal, a base metal oxide, a noble metal or a combination of these.

6. The method of claim 1, wherein the die is caused to move in a reciprocating motion to form a honeycomb structure having a zig-zag cell pattern.

7. The method of claim 6 wherein the reciprocating motion of the die is interrupted by intermittent pauses to form a honeycomb structure alternating between rows of straight through cells running parallel to the axis of extrusion and cross-directional flow channels.

8. The method of claim 7, wherein the cross-directional flow channels comprise Z-flow, L-flow and U-flow channels.

9. The method of claim 1, wherein the die consists of a plurality of concentric circular die sections.

10. The method of claim 1, wherein the means for moving the die comprises motor driven screws connected to the plates for causing movement of the plates while the extrudable material is passing through the die.

11. The method of claim 1, wherein the die comprises a plurality of laterally connected die sections separated from each other by a wall.

12. The extrusion die of claim 11, wherein each die section is further spaced from other sections by means of a shim.

13. The extrusion die of claim 1, wherein the die comprises a plurality of concentric die sections.

* * * * *